United States Patent [19]

Horiguchi et al.

[11] 4,189,766
[45] Feb. 19, 1980

[54] RACING CIRCUIT FOR CONTROLLING ACCESS OF PROCESSOR UNITS TO A COMMON DEVICE

[75] Inventors: Shinju Horiguchi, Tokyo; Joji Sahashi, Hachioji, both of Japan

[73] Assignee: Nippon Telegraph and Telephone Public Corporation, Tokyo, Japan

[21] Appl. No.: 895,762

[22] Filed: Apr. 12, 1978

[30] Foreign Application Priority Data

May 27, 1977 [JP] Japan .................................. 52-61103

[51] Int. Cl.$^2$ ........................... G06F 9/18; H04Q 3/00; G06F 13/00
[52] U.S. Cl. ............................... 364/200; 340/147 LP
[58] Field of Search ... 364/200 MS File, 900 MS File; 340/147 LP; 307/217, 232

[56] References Cited

U.S. PATENT DOCUMENTS

| | | | |
|---|---|---|---|
| 3,445,822 | 5/1969 | Driscoll | 364/200 |
| 3,492,648 | 1/1970 | Olsen et al. | 364/900 X |
| 3,543,246 | 11/1970 | Adams, Jr. | 364/200 |
| 3,593,302 | 7/1971 | Saito et al. | 364/200 |
| 3,603,935 | 9/1971 | Moore | 364/200 |
| 3,919,692 | 11/1975 | Kronies et al. | 364/200 |
| 3,934,230 | 1/1976 | Salle et al. | 364/200 |
| 4,016,539 | 4/1977 | Nanya | 340/147 LP |
| 4,121,285 | 10/1978 | Chen | 364/200 |

OTHER PUBLICATIONS

Christensen, "Programmable Priority Mechanism", in *IBM Technical Disclosure Bulletin*, vol. 17, No. 7, Dec. 1974, pp. 2052-2053.

*Primary Examiner*—Melvin B. Chapnick
*Attorney, Agent, or Firm*—Burgess, Ryan and Wayne

[57] ABSTRACT

A racing circuit wherein request signals which are asynchronously and simultaneously generated by a plurality of processor units for requesting the use of a common resource such as a memory are temporarily stored, and one of the stored request signals is selected so that the corresponding processor unit may access and use the common resource. The circuit provides a buffer arrangement for causing a first received request signal to lock out other request signals which follow the first signal too closely, and for providing access to the common memory or other device in the order in which access requests were received. The processor unit may control the racing circuit so that the processor unit may attain the exclusive use of the common resource as long as it desires.

5 Claims, 4 Drawing Figures

RACING CIRCUIT FOR CONTROLLING ACCESS OF PROCESSOR UNITS TO A COMMON DEVICE

BACKGROUND OF THE INVENTION

The present invention relates to a racing circuit which may select one of a number of request signals generated asynchronously by a plurality of processor units for requesting the exclusive use of a resource owned in common by them, thereby permitting the exclusive use of the common resource by one processor unit.

In the prior art racing circuits, these request signals are acknowledged and executed in the order of their occurrence, but the amount of required hardware is increased in proportion to $_nC_2$,* where n is the number of processor units, so that very complex circuitry results. There has been also invented and demonstrated a racing circuit of the type wherein a plurality of circuits having the same function and each assigned to a plurality of processor units, are arrayed in the form of a ring and a pulse or a train of pulses is circulated through these circuits in a predetermined order. Therefore, when the pulse or the train of pulses reaches one of these circuits which is connected to a processor unit which has been permitted to access and use a common resource, another processor unit is then permitted to access and use the common resource. This racing circuit, however, has a disadvantage in that the sequence of the occurrence of request signals is not taken into consideration.

*Number of combinations of n things taken 2 at a time.

In order to overcome these and other problems, there has been devised and demonstrated a racing circuit (U.S. Pat. No. 3,603,935) wherein in response to the timing signals from timing means which is synchronized with the timing signals for accessing a common resource common to a plurality of processor units, a plurality of request signals which are output from the processor units asynchronously are temporarily stored in memory means, one of the stored request signals is selected in accordance with the predetermined priority order so that the corresponding processor unit may access to the common resource during one memory cycle, the request from this processor unit may be disabled at the end of this memory cycle, and a next request signal is selected so that the above steps are cycled.

In this racing circuit, the acknowledgement and interruption of a request signal are made in synchronism with the timing signals. Especially the interruption of the request signal is made in response to a signal transmitted from a memory bank. Therefore the correct operations are ensured, but the interruption of the request signal is made at each memory cycle so that the processor unit cannot exclusively access and use the common resource for more than one memory cycle. Furthermore the request signal is interrupted in response to the address release signal transmitted within one memory cycle so that the processor unit cannot control a time during which it may access and use the common resource. The outputs from a priority selection circuit are stored in a memory means and then are output as an enable or permission signal for enabling the processor unit to access and use the common resource. The selected request signal disables a demand from a demand memory. As a result, a time allotted to the processor unit is controlled only by the common resource.

SUMMARY OF THE INVENTION

Accordingly, the primary object of the present invention is to provide a racing circuit wherein when no request signal is stored, request signals are stored whenever they are generated, one of the stored signals is selected and stored in memory means as one of the conditions for permitting an enable signal to be transmitted in response to an external enable signal to the corresponding processing unit, and the processing unit may access and use the common resource as long as it desires.

In order to accomplish the above object, the present invention comprises a request signal memory circuit consisting of pairs of NAND gates, each pair being interconnected in such a way that the output terminal of one NAND gate is connected to one input terminal of the other NAND gate the other input terminal of which receives a request signal. The output terminal of the other NAND gate is connected to one input terminal of said one NAND gate and to the other input terminal of said one NAND gate through an inhibit signal output NAND gate circuit. A first inverter circuit inverts the outputs from said other NAND gates. A priority selection circuit consisting of priority selection NAND gates is connected to the output terminals of said first inverter circuit and the priority selection NAND gates are interconnected with each other in such a way that the outputs from said first inverter circuit may be sequentially provided in accordance with a predetermined priority order. A selected signal memory circuit is provided, consisting of pairs of NAND gates, interconnected in such a way that one input terminal of one of said paired NAND gates is connected to the output terminal of the corresponding NAND gate in said priority selection circuit, the other input terminal of said one of said paired NAND gates is connected to the output terminal of the other of said paired NAND gates. The output terminal of said one of said paired NAND gates is connected to one input terminal of said other of said paired NAND gates, and the other input terminal of said other of said paired NAND gates is connected to an input terminal to which an enable or permission signal may be applied. A request signal output NAND gate circuit is connected to the output terminals of said NAND gates in said priority selection circuit for outputting a request signal to a common resource. A second inverter circuit is provided for inverting the outputs from said other NAND gates of said selected signal memory circuit, thereby outputting an enable or permission signal.

BRIEF DESCRIPTION OF THE DRAWINGS

Same reference numerals are used to designate similar parts throughout the figures.

DESCRIPTION OF THE PREFERRED EMBODIMENTS

Figure 1:
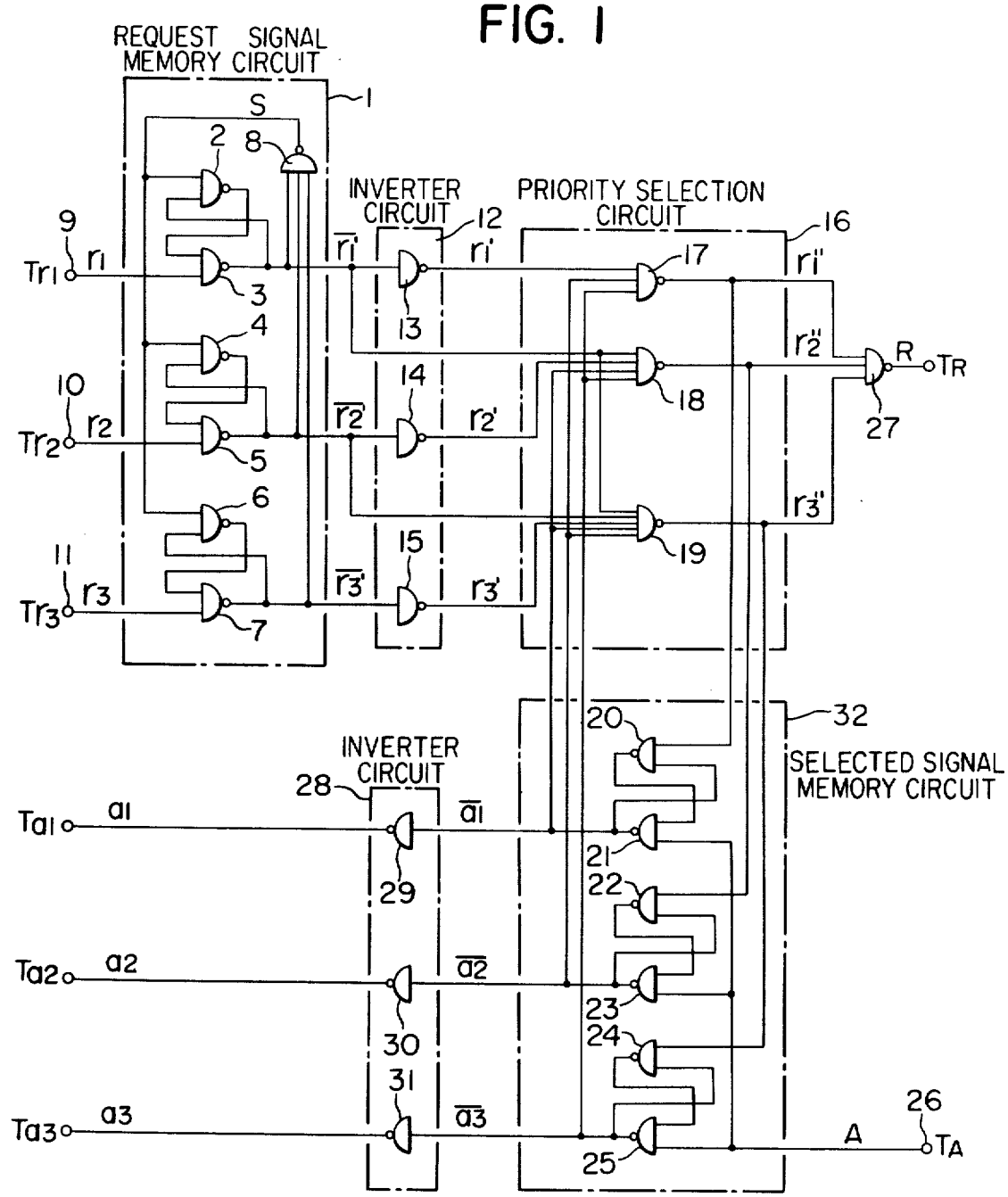
FIG. 1 is a diagram of a first embodiment of a racing circuit in accordance with the present invention.
Figure 2:
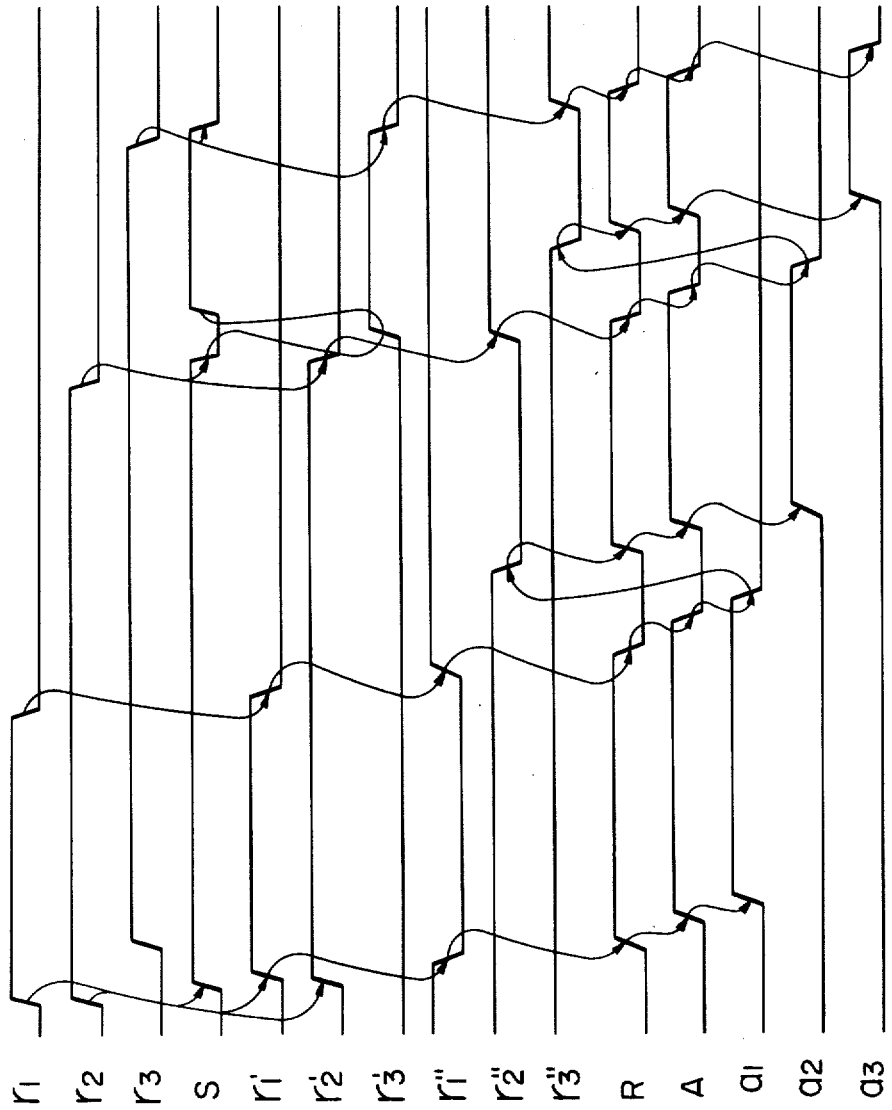
FIG. 2 is a timing diagram used for the explanation of the mode of operation thereof.
Figure 3:
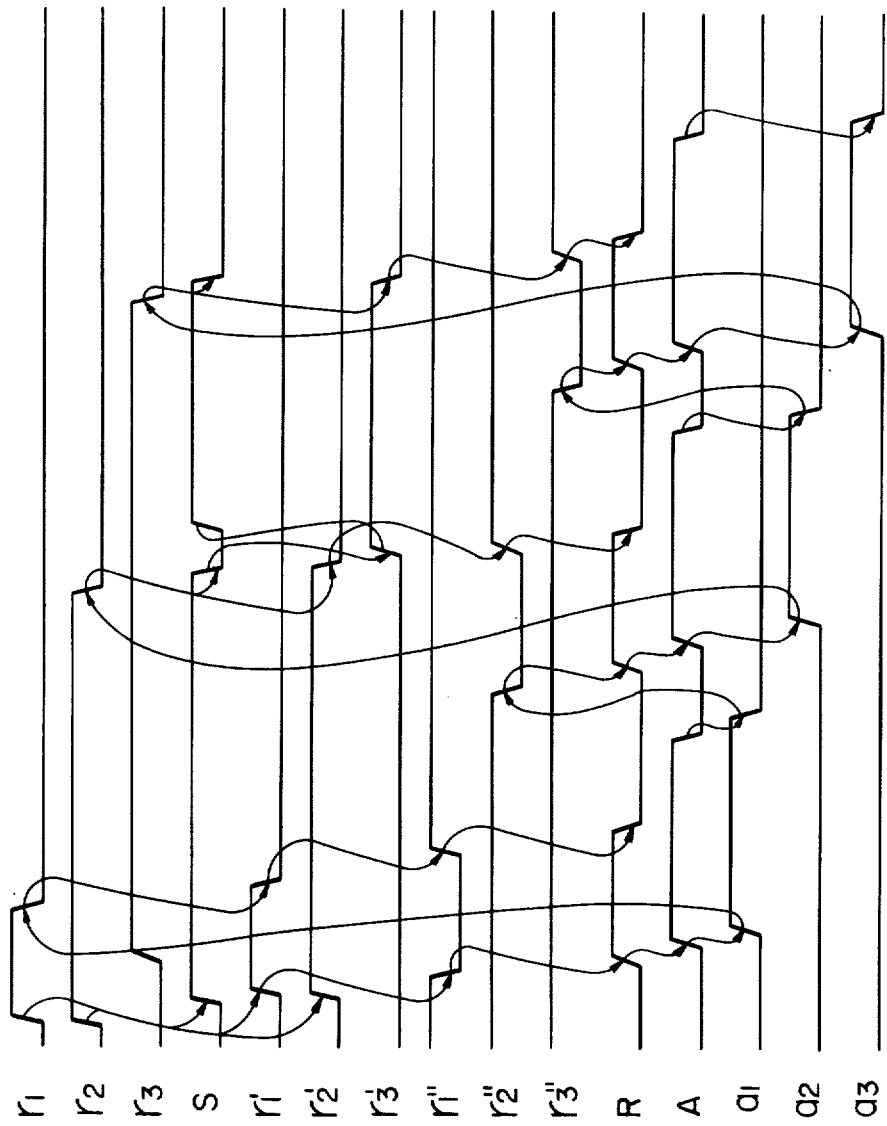
FIG. 3 is a timing diagram when a common resource controls a time during which a processing unit may access and use the common resource.

First Embodiment, FIGS. 1-3

Referring to FIG. 1, a first embodiment of a racing circuit in accordance with the present invention includes a request signal memory circuit 1 consisting of paired NAND gates 2 and 3; 4 and 5; and 6 and 7, the output terminal of one NAND gate being connected to the input terminal of the other, and a NAND gate 8 which combines the outputs $\bar{r}_1'$, $\bar{r}_2'$ and $\bar{r}_3'$ from the NAND gate circuits 2 and 3; 4 and 5; and 6 and 7 to generate an inhibit or suppression signal s. The output terminal of the NAND gate 8 is connected to the input terminals of the NAND gates 2, 4 and 6, and request signals $r_1$, $r_2$ and $r_3$ are input to the input terminals 9, 10 and 11 of the NAND gates 3, 5 and 7. The outputs $\bar{r}_1'$, $\bar{r}_2'$ and $\bar{r}_3'$ are inverted into $r_1'$, $r_2'$ and $r_3'$, respectively, by NAND gates 13, 14 and 15 in an inverter circuit 12, and the signals $r_1'$, $r_2'$ and $r_3'$ are applied to NAND gates 17, 18 and 19 in a priority selection circuit 16. The outputs $r_1''$ $r_2''$ and $r_3''$ from the NAND gates 17, 18 and 19 are applied to NAND gates 20, 22 and 24 which are paired with the other NAND gates 21, 23 and 25, respectively, in a selected signal memory circuit 32. The output terminal of one of the paired NAND gates 20 and 21; 22 and 23; and 24 and 25 is connected to the output terminal of the other. An enable or permission signal input terminal 26 is connected to the input terminals of the NAND gates 21, 23 and 25. The outputs $r_1''$, $r_2''$ and $r_3''$ from the NAND gates 17, 18 and 19 are also input to an output NAND gate circuit 27 from which is derived a resource request signal R. The output $\bar{r}_1'$ from the request signal memory circuit 1 is applied to the NAND gates 18 and 19 while the output $\bar{r}_2'$ is applied to the NAND gate 19 in the priority selection circuit 16. The output terminal of the NAND gate 21 in the selected signal memory circuit 32 is connected to the NAND gates 18 and 19 in the priority selection circuit 16, and the output terminal of the NAND gate 23 in the selected signal memory circuit 32 is connected to the NAND gates 17 and 19 in the priority selection circuit 16. The output terminal of the NAND gate 25 is connected to the NAND gates 17 and 18. The outputs $\bar{a}_1$, $\bar{a}_2$ and $\bar{a}_3$ from the NAND gates 21, 23 and 25 in the selected signal memory circuit 32 are applied to NAND gates 29, 30 and 31 in an inverter circuit 28, and the inverted signals $a_1$, $a_2$ and $a_3$ are derived from the output terminals $Ta_1$, $Ta_2$ and $Ta_3$.

Next referring further to FIG. 2, the mode of the operation of the first embodiment with the above construction will be described. Assume that the request signals $r_1$ and $r_2$ are input simultaneously from processing units. Then they are stored in the NAND gate pairs 2 and 3; and 4 and 5 in the request signal memory circuit 1. The outputs from the NAND gates 3 and 5 which are "0" are inverted by the NAND gate 8 into "1." The inverted signals "1" are applied to the NAND gates 2, 4 and 6 so that the paired NAND gates 6 and 7 may be inhibited to store the request signal $r_3$. The outputs $\bar{r}_1'$ and $\bar{r}_2'$ from the paired NAND gates 2 and 3; and 4 and 5 are also applied to the NAND gates 13 and 14 so that they are inverted to $r_1'$ and $r_2'$ (positive logic signal). Thereafter the NAND gates 17, 18 and 19 in the priority selection circuit 16 combine the outputs to generate only one signal $r_1''$, which is transmitted as the request signal R through the output NAND gate circuit 27 to a common resource. In response to the signal $r_1''$ (negative logical signal), the output from NAND gate 20 in the selected signal memory circuit 32 becomes "1" so that the NAND gate 21 may be ready to receive the permission signal A from the input terminal 26.

The permission signal A is generated in response to the request signal R and is transmitted through the NAND gate 21 and the NAND gate 29 in the inverter circuit 28 so that the enable or permission signal $a_1$ is transmitted to the processing unit which has generated the request signal $r_1$.

The processing unit which has received this signal $a_1$ is enabled to access to the common resource. Upon completion of the use of the common resource (the time for using the common resource being controlled by the processing unit), the request signal $r_1$ disappears. Therefore the output $\bar{r}_1'$ from the NAND gate 13 in the inverter circuit 12 is "0" while the output $r_1''$ from the NAND gate 17 in the priority selection circuit 16 becomes "1", whereby the transmission of the request signal R to the common resource is interrupted. As a result, the common resource interrupts the signal A. That is, the permission signal A becomes "0" so that the output $a_1$ from the NAND gate 29 in the inverter circuit 28 also becomes "0." Thus the request from the processing unit which generated the request signal $r_1$ has been executed.

Meanwhile, the output $\bar{a}_1$ from the NAND gate 21 in the priority selection circuit 16 becomes "1"; the output $\bar{r}_1'$ from the NAND gate 3 in the request signal memory circuit 1 becomes "1"; the output $\bar{a}_3$ from the NAND gate 25 in the selected signal memory circuit 32 also becomes "1"; and the output $\bar{a}_1$ from the NAND gate 21 becomes "1." Therefore the signal $r_2'$ is converted by the NAND gate 18 in the priority selection circuit 16 into the signal $r_2''$ (negative logic) and is transmitted as the request signal R to the common resource.

In response to the signal $r_2''$ which is "0," the output from the NAND gate 22 in the selected signal memory circuit 32 becomes "1" so that the NAND gate 23 may be ready for receiving the enable or permission signal A from the input terminal 26. In response to the request signal R the common resource generates the enable or permission signal A. Therefore the output $\bar{a}_2$ from the NAND gate 23 in the selected signal memory circuit 32 becomes "0" and is inverted by the NAND gate 30 in the inverter circuit 28 into $a_2$ which is "1." In response to this enable signal $a_2$, the processing unit which has generated the request signal $r_2$ may access and use the common resource. Upon completion of the use of the common resource, this processing unit interrupts or steps the request signal $r_2$.

In response to the request signals $r_1$ and $r_2$ both of which are now "0," the outputs from the NAND gates 3 and 5 in the request signal memory circuit 1 become "1" and the output from the NAND gate 7 has been "1." As a result, the output S from the inhibit signal output NAND gate 8 becomes "0" so that the request signal memory circuit 1 is now ready to receive the request signals. That is, the outputs from the NAND gates 2, 4 and 6 become "1." Therefore when the request signal $r_3$ is present at the input terminal 11, it is stored in the paired NAND gates 6 and 7 so that the output from the NAND gate 7 becomes "0" and consequently the output from the inhibit signal output NAND gate 8 becomes "1." Therefore the request signal memory circuit 1 is prohibited to accept the request signals $r_1$ and $r_2$. The request signal $r_3$ is handled in a manner substantially similar to that described above.

So far a racing circuit with three inputs has been described, but in case of a racing circuit with a number N of inputs, (N×7) NAND gates must be provided and interconnected in the manner described above, the seven NAND gates required for each processing unit being 2, 3, 13, 17, 20, 21 and 29.

When the request signals $r_1$ and $r_2$ almost simultaneously arrive at the request signal memory circuit 1 but when the request signal $r_2$ arrives slightly sooner than the request signal $r_1$ before the NAND gate 8 outputs "1," the NAND gate 18 in the priority selection circuit 16 generates the output $r_2''$ which is an impulse with a very narrow pulse width. In order to eliminate this impulse, an even number of NAND gates may be connected to the priority signal output NAND gate 27. Furthermore in response to this impulse, the NAND gate 22 in the selected signal memory circuit 32 is momentarily set into the state for receiving the enable or permission signal A. However the enable or permission signal A is generated only after the common resource has received the request signal R so that the NAND gate 22 may be disabled before the enable or permission signal A arrives. Therefore the erratic operations of the racing circuit due to the above impulse may be avoided. In order to reduce the pulse width of this impulse, it is preferable that the NAND gate 8 may be made up of the elements which exhibit a less delay time.

With the circuit shown in FIG. 1, the racing may be executed by setting the request signals $r_1$, $r_2$ and $r_3$ to "0" when the enable or permission signal $a_1$, $a_2$ or $a_3$ has been received as shown in FIG. 3. In this case, a time interval during which any of the signals $a_1$, $a_2$ and $a_3$ being output is a predetermined time which is controlled by the common resource.

The first embodiment described hereinabove with reference to FIGS. 1-3 may be controlled from both the processing units and the common resource.

Figure 4:
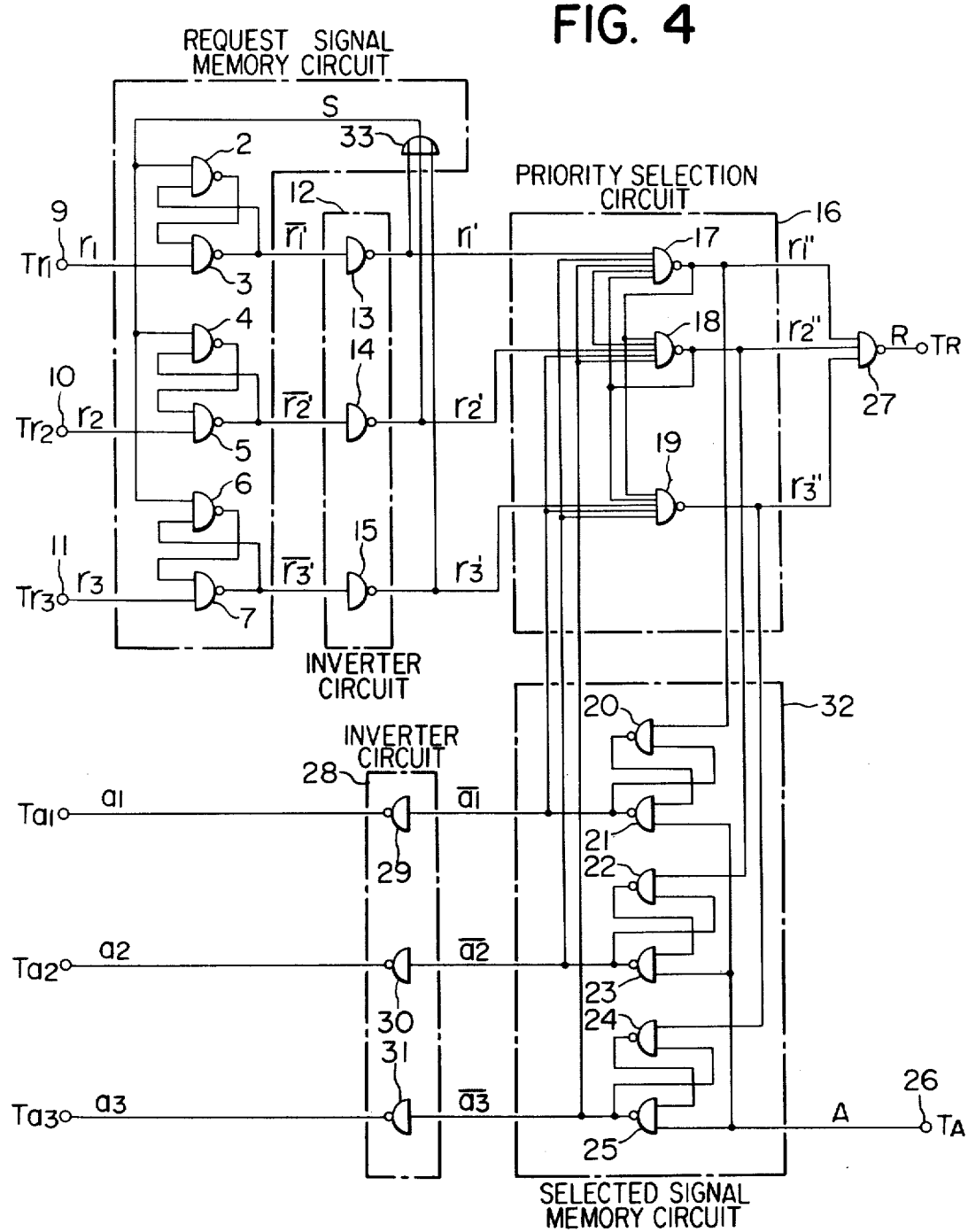
FIG. 4 is a diagram of a second embodiment of the present invention.

Second Embodiment, FIG. 4

A second embodiment of a racing circuit in accordance with the present invention shown in FIG. 4 is substantially similar in construction to the first embodiment shown in FIG. 1 except that the inhibit signal output NAND gate 8 consists of an OR gate 33, the input terminals of which are connected to the output terminals of the NAND gates 13, 14 and 15 in the inverter circuit 12 and that the output terminals of two of the three NAND gates 17, 18 and 19 in the priority selection circuit 16 are connected to the input terminals of the remaining NAND gate. It should be also noted that the signals $\bar{r}_1'$ and $\bar{r}_2'$ are not applied to the NAND gates 18 and 19, respectively. The mode of operation is substantially similar to that of the first embodiment.

What is claimed is:

1. A racing circuit for controlling access of a plurality of processor units to a common device, comprising:

a request signal memory circuit consisting of a plurality of first pairs of NAND gates, the output terminal of one NAND gate of each pair being connected to one input terminal of the other NAND gate thereof, the output terminal of the other NAND gate of said pair being connected to one input of said one NAND gate thereof, an inhibit signal output NAND gate, the other terminal of said one NAND gate of said pair being connected to the output terminal of said inhibit signal output NAND gate, the input terminals of the inhibit signal output NAND gate being connected to the output terminals of each of said other NAND gates in each of said pairs of NAND gates;

a priority selection circuit comprising a plurality of priority selection NAND gates, a corresponding plurality of first inverter circuits, the outputs of each of the pairs of NAND gates of said request signal memory circuit being respectively connected to (i) the input terminals of corresponding priority selection NAND gates through corresponding ones of said first inverter circuits and to (ii) one or more input terminals of another pair of the priority selection NAND gates;

an output NAND gate having input terminals connected so the output terminals of said priority selection NAND gates and one output terminal for outputting a request signal; and a selected signal memory circuit comprising a plurality of second pairs of NAND gates, the output terminal of one NAND gate of each of said second pairs being connected to one input terminal of the other NAND gate thereof, the output terminal of the other NAND gate of each of said second pairs being connected to one input of the one NAND gate thereof, the other terminal of the one NAND gate thereof being connected to one of the output terminals of said priority selection circuit, the other terminal of the other NAND gate thereof being connected to a permission signal input terminal, an output of the other NAND gate thereof being connected to one or more of the input terminals of the priority selection NAND gates coupled to each of said first pairs of NAND gates, a plurality of second inverter circuits, each of said second inverter circuits having an input terminal coupled to an output terminal of a corresponding one of said other NAND gates of said first pairs of NAND gates, whereby the output terminals of the other NAND gates of said signal memory circuit output permission signals through said second inverter circuits.

2. A racing circuit as set forth in claim 1 wherein the input terminals of said NAND gates of the priority selection circuit are respectively connected to those outputs of the NAND gates of said selected signal memory circuit to which the output of said NAND gates of the priority selection circuit are not connected.

3. A racing circuit as set forth in claim 1 wherein said inhibit signal output gate consists of a NAND gate.

4. A racing circuit as set forth in claim 1 wherein said inhibit signal output gate consists of an OR gate the input terminals of which are connected to the output terminals of said first inverter circuit.

5. A racing circuit as set forth in claim 1 wherein said first and second inverter circuits each consist of NAND gates.

* * * * *